Nov. 19, 1968  J. W. SCHAEFER  3,411,526
HYDRAULIC COUPLING

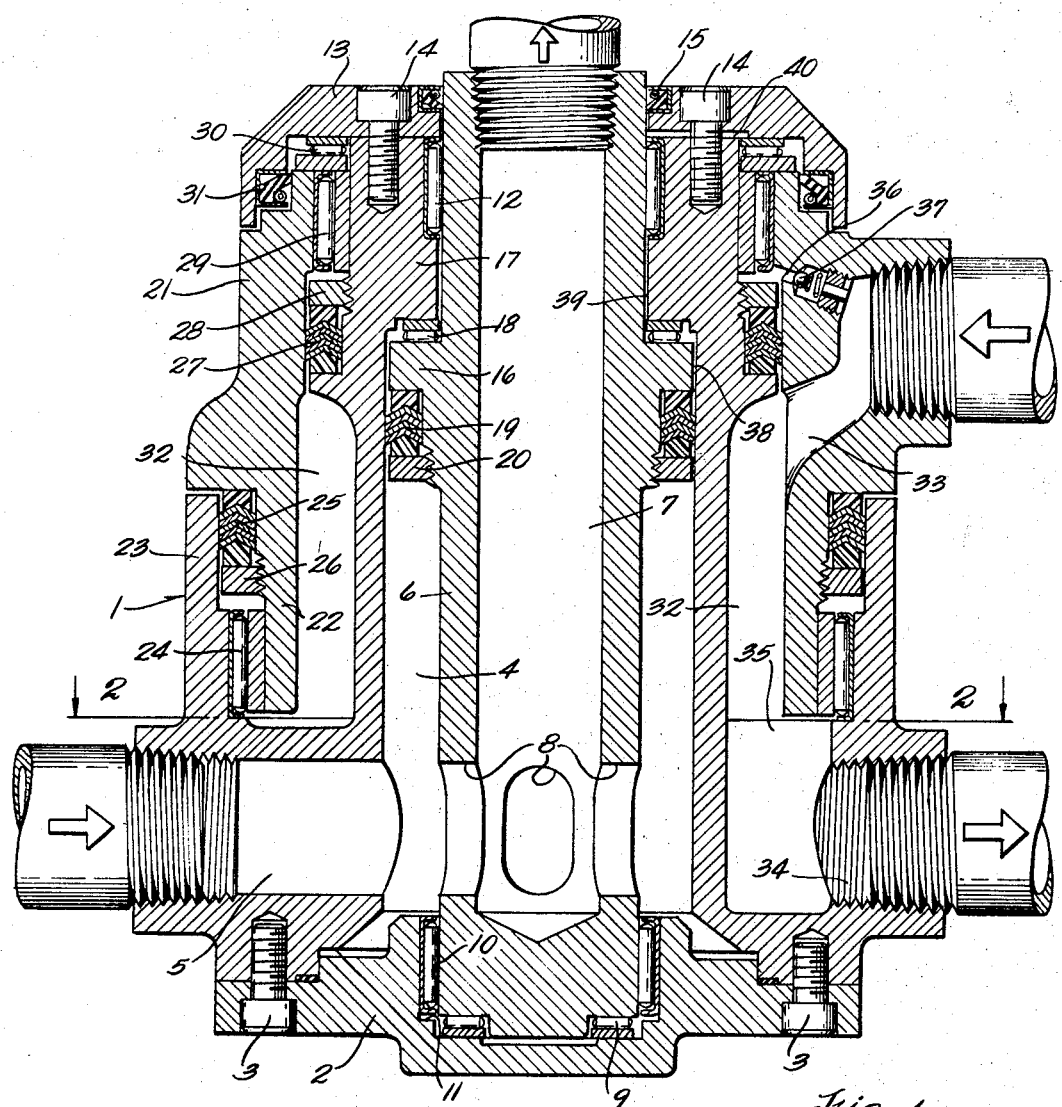

Filed March 9, 1967  2 Sheets-Sheet 2

Inventor
John W. Schaefer

Andrus & Starke
Attorneys 3,411,526
HYDRAULIC COUPLING
John W. Schaefer, Barrington, Ill., assignor to A. O. Smith Harvestore Products, Inc., Arlington Heights, Ill., a corporation of Delaware
Filed Mar. 9, 1967, Ser. No. 621,902
12 Claims. (Cl. 137—312)

ABSTRACT OF THE DISCLOSURE

The invention is directed to a hydraulic coupling for connecting the hydraulic system of a stationary member to the hydraulic system of a rotating member. A portion of the high pressure fluid passing through the coupling is permitted to leak by controlled action directly into the low pressure return stream of fluid and the leaking high pressure fluid is directed through the bearing assemblies to lubricate the bearings as it passes to the low pressure fluid stream.

---

This invention relates to a hydraulic coupling and more particularly to a coupling for connecting the hydraulic system of a stationary element to a hydraulic system of a rotating element.

To connect the hydraulic system of the stationary member with the hydraulic system of a rotating member, a hydraulic swivel coupling is required. In the conventional hydraulic swivel coupling, high pressure fluid is supplied through the coupling to the rotating member and low pressure fluid is returned through the coupling to the supply source. In a coupling of this type, there is often a problem of leakage between the high pressure and low pressure fluids. In some devices, leakage of the high pressure fluid is not a problem of consequence and can be tolerated. However, when using the hydraulic coupling in an environment containing material, such as food products, which can be contaminated by the hydraulic fluid, it is necessary to prevent leakage of the high pressure fluid or to control the leakage so that it will not contaminate the material.

The present invention is directed to an improved hydraulic coupling for connecting the hydraulic system of a stationary element to the hydraulic system of a rotating element. According to the invention, the high pressure fluid supplied through the coupling is permitted to leak or escape by controlled action into the returning low pressure fluid stream. As an added feature, the escaping high pressure fluid is directed through the bearing assemblies to thereby lubricate the bearings as it flows to the low pressure fluid stream.

More specifically, the hydraulic coupling includes a stationary housing having a high pressure fluid inlet opening which communicates with an internal high pressure chamber within the housing. Mounted for rotation within the housing is a hollow sleeve. The inner end of the sleeve is provided with a series of openings which provide communication between the hollow interior of the sleeve and the high pressure chamber, while the outer end of the sleeve is connected to the hydraulic drive system of the rotating element.

Surrounding the housing is an outer rotatable casing which is journaled for rotation about the housing and is spaced from the housing to provide a low pressure fluid chamber. Low pressure fluid from the rotating element being driven is returned to the low pressure chamber and the low pressure chamber communicates with an outlet formed in the housing so that the low pressure fluid will pass through the low pressure chamber to the outlet and back to the supply source.

To control leakage of the high pressure fluid, a vent passage is provided which connects the high pressure chamber and the low pressure chamber so that fluid will continually leak through the vent passage to the low pressure chamber. A suitable check valve is located within the vent passage which prevents flow of the fluid in the opposite direction. The vent passage extends through the bearings which journal the sleeve within the housing and through the bearings which journal the outer casing on the housing. Thus, the leakage of the high pressure fluid is not only controlled to prevent the fluid from escaping to the exterior but the vented hydraulic fluid passes through the bearing assemblies to lubricate the bearings.

In a modified form of the invention, the inner rotatable member or sleeve is spaced inwardly of the outer housing to provide a series of annular, axially spaced, high pressure chambers, each of which is connected to a source of fluid under pressure. With this arrangement each high pressure chamber may carry different volumes of fluid at different pressures in various timed cycles depending on the valving which controls the supply of fluid to each chamber. The inner rotatable member is provided with a series of longitudinal passages each of which interconnects one of the high pressure chambers and an individual hydraulic circuit having a separate function. After the work has been performed in each of the separate hydraulic circuits, the fluid is returned from each circuit to the low pressure chamber located between the housing and the outer rotatable casing, and then back to the supply source or reservoir.

To control leakage of the high pressure fluid, a vent passage connects the high pressure section and the low pressure chamber so fluid will continually leak to the low pressure chamber from the high pressure section.

The present invention provides a simple and effective hydraulic coupling for connecting a stationary high pressure hydraulic fluid line to a rotating hydraulic fluid line. The coupling is particularly adapted for use in environments containing a material which is subject to contamination by hydraulic fluid. To prevent contamination of the material, a controlled leakage system is provided in which the high pressure fluid is continuously vented to the low pressure side of the coupling and this prevents the escape of high pressure fluid to the exterior. In addition, the venting system flows the hydraulic fluid through the bearings so that the controlled leakage functions in a dual capacity to not only prevent the escape of high pressure hydraulic fluid, but also to lubricate the bearings.

Other objects and advantages will appear in the course of the following description.

The drawings illustrate the best mode presently contemplated of carrying out the invention.

In the drawings:

FIG. 1 is a vertical section of the hydraulic coupling of the invention;

FIG. 2 is a section taken along line 2—2 of FIG. 1;

Figures 3, 4:
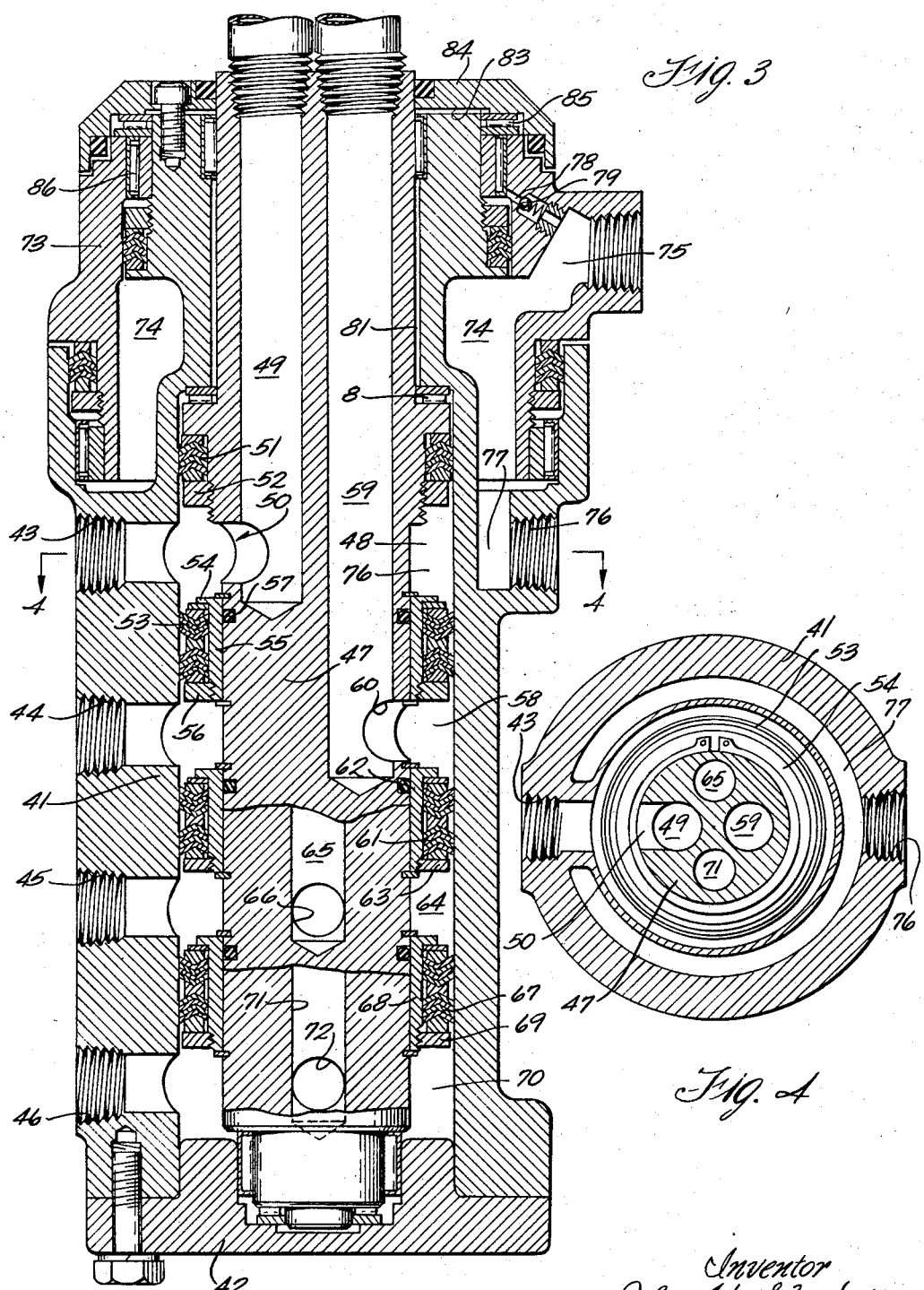
FIG. 3 is a vertical section of a modified form of the invention incorporating a series of individual hydraulic inlet lines.
FIG. 4 is a transverse section taken along line 4—4 of FIG. 3.

The hydraulic coupling shown in FIG. 1 includes a stationary housing 1 having an open bottom end which is closed by a base casting 2 secured to the housing by bolts 3.

The central interior of housing 1 defines a high pressure fluid chamber 4 and the housing is provided with a fluid supply opening 5 which communicates with the chamber 4. The fluid supply opening is connected to a suitable source of high pressure hydraulic fluid and the fluid flows through the opening 5 into the chamber 4.

Mounted for rotation within the chamber 4 is a hollow sleeve 6 having an axial passage 7. A series of holes 8 are formed in the lower end portion of the sleeve 6 and provide communication between the high pressure chamber 4 and the passage 7 so that the high pressure fluid may flow into the passage 7. The upper end of the sleeve 6 is threaded and is adapted to be connected to a hydraulic line associated with a rotating element. The sleeve 6 rotates with the rotating drive element, not shown, and both the sleeve and rotating element rotate with respect to the stationary housing 1.

Sleeve 6 is journalled for rotation within housing 1 by a thrust bearing assembly 9 and a roller bearing assembly 10 which are located within a well 11 formed in the base 2. In addition, the upper end of the sleeve 6 is journalled within the housing 1 by a roller bearing assembly 12, and the bearing assembly 12 is retained within a recess formed in the upper end of housing 1 by a cap 13 which is secured to the housing 1 by a series of bolts 14. A suitable seal 15 is located within a recess in the cap 13 and serves to seal the joint between the stationary cap and the rotating sleeve 6.

Formed centrally on the sleeve 6 is an anuular projection 16 which is spaced beneath an annular projection 17 formed on the interior of the housing 1. A thrust bearing assembly 18 is located between the projections 16 and 17.

To seal the joint or interface between the sleeve 6 and the housing 1, a chevron seal 19 is located beneath the projection 16 and is held in place by a ring 20 which is threaded onto the sleeve 6. The sealing pressure of the seal 19 can be varied by adjustment of the ring 20. As the ring 20 is threaded down, the seal 19 will spread outward against the inner surface of housing 1 to provide a greater sealing effect.

A casing 21 is journalled for rotation about the housing 1. The casing 21 is provided with a downwardly extending flange 22 which is spaced inwardly from an upstanding flange 23 formed on housing 1 and a bearing assembly 24 is located between the flanges 22 and 23. In addition to the bearing assembly, an annular chevron seal 25 is located between flanges 22 and 23 and the sealing pressure of the seal 25 can be varied by adjustment of the ring 26 which is threaded on the exterior of the flange 22.

A second seal 27 is located between the housing 1 and the casing 21 and, in the manner previously described, the sealing pressure of seal 27 can be varied by the threaded adjustment of ring 28 which is located above the seal 27.

The upper end of casing 21 is journalled around the housing 1 by a roller bearing assembly 29 and a thrust bearing assembly 30 is located between the upper end of the casing 21 and the cap 13. A seal 31 is located within recesses in the cap 13 and the casing 21 and serves to prevent leakage of fluid between the members.

The casing 21 is spaced outwardly from the housing 1 to provide an annular low pressure fluid chamber 32 and the casing is provided with a return fluid opening 33 which communicates with the chamber 32. The opening 33 is threaded and a hydraulic line is adapted to be engaged with the opening and is connected to the rotating element. Chamber 32 communicates with lower annular chamber 35, and casing 21 is formed with a fluid outlet 34 which communicates with chamber 35 so that the low pressure fluid can flow from the chamber 32 through the lower chamber 35 to the outlet 34 and then back to the supply source.

To provide for controlled leakage of the high pressure fluid, a flow path is provided so that the high pressure fluid from high pressure chamber 4 can continuously leak or escape to the low pressure chamber 32. In this regard, a passage 36 is provided in the casing 21 and provides communication between the chamber 32 and the space between the casing 21 and the housing 1. A ball check valve 37 is located in the passage 36 and permits the flow of fluid into the chamber 32 but prevents the flow of fluid in the opposite direction.

In operation, the high pressure fluid enters the supply inlet 5 and passes to the high pressure chamber 4. The fluid then passes through holes 8 and passage 7 in sleeve 6 and is supplied to the element to be rotated. The low pressure return fluid is returned from the rotating element through the opening 33 and passes through chamber 32 to the outlet 34 and then back to the supply source. A portion of the high pressure fluid in chamber 4 will pass upwardly through the seal 19, through the clearance 38, through the thrust bearing assembly 18, then upwardly through the clearance 39 and through the roller bearing assembly 12. After passing through the roller bearing assembly 12, the high pressure fluid then passes through a series of radial grooves 40 formed in the lower surface of the cap 13 and then downwardly through the thrust bearing assembly 30, the roller bearing assembly 29 to the vent passage 36 and then to the low pressure chamber 32. With this system, a controlled leakage of the high pressure fluid is provided and this leakage is directed to the return low pressure fluid stream. Furthermore, the leakage route passes through the bearing assemblies which journal the sleeve 6 within the housing 1, and journal the outer casing 21 around the housing so that all of the bearings are lubricated by the flow of the venting high pressure fluid.

The hydraulic swivel coupling of the invention provides a simple and inexpensive means for coupling a stationary hydraulic line to a rotating hydraulic line. The device is particularly adapted for use in environments which contain products which can be contaminated by hydraulic fluid. In this regard the hydraulic fluid is permitted to leak or escape in a controlled flow to the flow pressure side of the coupling so that the high pressure fluid will not escape to the exterior and contaminate the product.

By proper adjustment of the threaded ring 20, the sealing pressure of the seal 19 can be varied and this in turn provides an adjustment of the leakage rate of the high pressure fluid from the high pressure chamber 4 to the low pressure chamber 32.

FIGS. 3–4 illustrate a modified form of the invention in which hydraulic fluid is supplied through the coupling to a series of working elements on the rotating part of the apparatus. In this embodiment the coupling includes an outer housing 41 and the lower open end of the housing 41 is enclosed by a base casting 42, similar to casting 2 of the first embodiment.

Hydraulic fluid is introduced into the interior of housing 41 through a series of inlet openings 43, 44, 45 and 46, each of which is connected by a conduit, not shown, to a source of hydraulic fluid under pressure.

Disposed within the interior of the housing 41 is a rotatable sleeve 47 attached to the rotating part of the apparatus and adapted to rotate with respect to the fixed housing 41. The sleeve 47 is spaced inwardly from the housing 41 to provide an annular chamber 48 between the members which communicates with the inlet 43′. A vertical passage 49 is formed in the sleeve 47, and a radial port 50 connects the lower end of vertical passage 49 with the annular chamber 48, so that as the sleeve 47 rotates, the inlet passage 43 will be in continual communication with the passage 49. The upper end of the vertical passage 49 is connected by a suitable conduit, not shown, to an element on the rotating part of the apparatus which utilizes hydraulic fluid, such as a hydraulic motor, cylinder or the like.

The sleeve 47 is journaled within the housing 41 by a series of radial and thrust bearings similar to that described with respect to the first embodiment.

To seal the joint between the sleeve 47 and the housing 1 above chamber 48, a chevron seal 51 is located beneath a shoulder formed in the sleeve 47 and is held in place by a ring 52 which is threaded onto the sleeve 47. The sealing pressure of the seal 51 can be varied by threaded adjustment of the ring 52. As the ring 52 is threaded down, the seal 51 will spread outwardly against the inner surface of the housing 1 to provide a greater sealing effect.

Located beneath the annular chamber 48 is a second seal 53 which is positioned beneath a flange 54 of a ring 55 which is maintained in position on the sleeve 47 by a pair of conventional snap rings. The seal 53 is urged against the flange 54 by a ring 56 threaded onto the lower end of the ring 55. As in the case of seal 51, the sealing pressure of seal 53 can be varied by threaded adjustment of the ring 56.

The annular space beneath seal 53 defines a second high pressure chamber 58 which communicates with the inlet 44. A second vertical passage 59 is formed in the sleeve 47 and the lower end of the passage 59 communicates through radial port 60 with the annular chamber 58. With this construction the inlet 44 will be in continuous communication with the vertical passage 59 as the sleeve 47 rotates within the housing 41.

The upper end of the annular chamber 58 is sealed by the seal 53, while the lower end of the chamber 58 is sealed by a chevron seal 61 located between the upper flange of a ring 62 which is positioned on the outer surface of sleeve 47 by snap rings. A threaded ring 63 bears against the lower end of the seal 61, and the sealing pressure of the seal 61 can be varied by threaded adjustment of the ring 63.

Located beneath the seal 61 is an annular, high pressure chamber 64 which communicates with the inlet 45. Sleeve 47 is formed with a vertical passage 66 and the lower end of passage 66 communicates through radial port 60 with the annular chamber 64.

The lower end of the chamber 64 is sealed off by a seal 67, similar to seals 51, 53 and 61. The upper end of the seal 67 bears against the flange of a ring 68 which is positioned on the outer surface of housing 47 by a pair of snap rings, while a ring 69 is threaded onto the lower end of ring 68 and bears against the seal 67.

The annular space between the lower seal 67 and the end cap 62 defines an annular chamber 70 communicating with inlet 46. The sleeve 47 is provided with a vertical passage 71 which communicates through radial ports 72 with the annular chamber 70 so that the inlet 46 will be in continual communication with the vertical passage 71 as the sleeve 47 rotates within the housing 41.

Thus the inlet ports 43, 44, 45 and 46 are in continuous communication with the respective vertical passages 49, 59, 65 and 71, as the sleeve 47 rotates within the housing 41.

An outer casing 73, similar to casing 21 of the first embodiment, is mounted for rotation on the outer surface of housing 41.

The lower end of casing 73 is spaced outwardly of the housing 1 to provide an annular, low pressure chamber 74 between the members and the upper end of chamber 74 is connected to a return passage 75 formed in the housing 1. The return passage 75 is connected to the various elements on the rotating part of the apparatus which utilize hydraulic fluid and the fluid from each element is returned into the passage 75. An outlet 76 is provided in the housing 41 which communicates with the chamber 77, and chamber 77 is in communication with the lower end of chamber 74 in casing 73. A suitable conduit connects the outlet 77 to a reservoir or other tank for the fluid.

As in the case of the first embodiment, a by-pass passage 78 connects the high pressure section with the low pressure section. More specifically, the passage 78 provides communication between the low pressure inlet 75 and the high pressure chamber 48, and a ball check valve 79 is located in the passage 78 and permits the flow of fluid into the low pressure chamber 75 but prevents the flow of fluid in the opposite direction.

In operation, the high pressure fluid enters the supply inlets 43–46 and then passes through the passages 49, 55, 65 and 71 to the various elements on the rotating part of the apparatus which utilize hydraulic fluid. The low pressure of fluid is returned from the rotating elements through the opening 75 to the chamber 74 and then through the outlet 77 to the reservoir.

A portion of the high pressure fluid in chamber 48 will pass upwardly through the seal 51, through thrust bearing assembly 80 and upwardly through the clearance 81 between the sleeve 47 and the housing 41. After passing through the roller bearing assemblies 82 at the upper end of the unit, the high pressure fluid then passes through a series of radial grooves 83 formed in the lower surface of the cap 84 and then downwardly through the thrust bearing assembly 85 and roller bearing assembly 86 to the passage 78 and then to the low pressure chamber 75. With this system, controlled leakage of the high pressure fluid is provided and the leaking high pressure fluid, as previously described with respect to the first embodiment, passes through the bearing assemblies so that the bearings are lubricated by the flow of the high pressure fluid.

With the structure shown in FIGS. 3–5, each of the inlet ports 43–46 can carry different volumes of fluid, different pressures and/or different timing, depending on the valves which control the supply of fluid to each of the ports.

The portion of the internal sleeve 47 disposed below the ring 52 is generally cylindrical in shape and the various rings 55, 62 and 68 are positioned on the sleeve 47 by snap rings. This simplifies the machining of the sleeve 47 and enables the position of the seals to be varied to accommodate different spacing of the inlets 43–46.

Various modes of carrying out the invention are contemplated as being within the scope of the following claims particularly pointing out and distinctly claiming the subject matter which is regarded as the invention.

I claim:

1. A hydraulic coupling, comprising a stationary member having a high pressure section connected to a source of high pressure hydraulic fluid and having a low pressure section, a first rotatable member journalled for rotation with respect to said stationary member and including passage means communicating with said high pressure section and connected to a hydraulic system of a rotating element, a second rotatable member journalled for rotation with respect to said stationary member and having passage means connected to the hydraulic system of the rotating element and communicating with the low pressure section, restricted passageway means connecting the high pressure section with the low pressure section for continuously venting a portion of the high pressure fluid from the high pressure section to the low pressure section, and adjustable means located in said restricted passageway means for varying the rate of flow of the fluid through said restricted passageway means.

2. A hydraulic coupling, comprising a stationary member having a high pressure section connected to a source of high pressure hydraulic fluid and having a low pressure section, a first rotatable member journalled for rotation with respect to said stationary member and including passage means communicating with said high pressure section and connected to a hydraulic system of a rotating element, a second rotatable member journalled for rotation with respect to said stationary member and having passage means connected to the hydraulic system of the rotating element and communicating with the low pressure section, restricted passageway means connecting the high pressure section with the low pressure section for continuously venting a portion of the high pressure fluid from the high pressure section to the low pressure section, said restricted passageway means extending through at least one of said rotatable members, and check valve means located in said restricted passageway means for permitting the flow of fluid from the high pressure section to the low pressure section and for preventing the flow of fluid in the opposite direction.

3. A hydraulic coupling, comprising a stationary member having a high pressure section connected to a source of high pressure hydraulic fluid and having a low pressure section, a first rotatable member journalled for rotation with respect to said stationary member and including passage means communicating with said high pressure section and connected to a hydraulic system of a rotatable member, a second rotatable member journalled for rotation with respect to said stationary member and having passage means connected to the hydraulic system of the rotating element and communicating with the low pressure section, restricted passageway means connecting the high pressure section with the low pressure section for continuously venting a portion of the high pressure fluid from the high pressure section to the low pressure section, and adjustable means located in said restricted passageway means for varying the rate of flow of the fluid through said restricted passageway means, said rotatable members being journalled with respect to the stationary member by bearing assemblies and said bearing assemblies are located in said restricted passageway means whereby the fluid flowing through the restricted passageway means will lubricate the bearing assemblies.

4. A hydraulic coupling, comprising a stationary housing having an inlet opening connected to a source of high pressure hydraulic fluid and having a return opening connected to said source, said housing also having an internal high pressure fluid chamber communicating with said inlet opening, a hollow member journalled for rotation within the housing and having a passage providing communication between the interior of the hollow member and the high pressure fluid chamber, said hollow member adapted to be connected to a hydraulic system of a rotating element, an annular member journalled for rotation on the outside of the housing and having a portion spaced from the housing to provide a low pressure fluid chamber, said annular member having a return inlet connected to the hydraulic system of the rotating element for returning fluid to the low pressure chamber, conduit means connecting the low pressure chamber with the return opening in the housing, and vent passage means connecting the high pressure fluid chamber with the low pressure fluid chamber for continuously venting a portion of the high pressure fluid from the high pressure chamber to the low pressure chamber.

5. A hydraulic coupling, comprising a stationary housing having an inlet opening connected to a source of high pressure hydraulic fluid and having a return opening connected to said source, said housing also having an internal high pressure fluid chamber communicating with said inlet opening, a tubular member journalled for rotation with the interior of the housing and having a passage providing communication between the interior of the tubular member in the high pressure chamber whereby high pressure fluid is supplied to the interior of said tubular member, said tubular member being adapted to be connected to the hydraulic system of a rotating element, an outer casing member journalled for rotation on the outside of the housing and having a portion spaced outwardly of the housing to provide a low pressure annular chamber, said casing member having a return inlet connected to the hydraulic system of the rotating element and communicating with the low pressure chamber, conduit means connecting the low pressure chamber with the return opening in said housing, restricted passage means separate from said tubular member for connecting the high pressure chamber to the low pressure chamber, and check valve means located in said passage means for permitting flow of hydraulic fluid from the high pressure chamber to the low pressure chamber and for preventing flow of fluid in the opposite direction.

6. The structure of claim 6 and including means for adjusting the rate of flow of hydraulic fluid through said passage means.

7. A hydraulic coupling, comprising a stationary housing having an inlet opening connected to a source of high pressure hydraulic fluid and having a return opening connected to said source, said housing also having an internal high pressure fluid chamber communicating with said inlet opening, a hollow sleeve disposed within the housing and disposed to be connected to the hydraulic system of a rotating element, first bearing means disposed at the interface between the tubular member and the housing for journalling the sleeve for rotation within the housing, said sleeve having an opening providing communication between the interior of said sleeve and said high pressure chamber, an annular member disposed outwardly of the housing and having a portion spaced from the housing to provide a low pressure fluid chamber, second bearing means disposed at the interface between the housing and the annular member for journalling the annular member about the housing, said annular member having a return inlet connected to the hydraulic system of the rotating element and communicating with the low pressure chamber, conduit means connecting the low pressure chamber with the return opening in the housing, first passage means connecting the high pressure fluid chamber with the interface between the housing and the sleeve, second passage means connecting the interface between the housing and the sleeve with the interface between the housing and the annular member, and third passage means connecting the interface between the housing and the annular member with the low pressure chamber whereby high pressure fluid will pass through said first, second and third passage means from the high pressure chamber to the low pressure chamber and lubricate the first and second bearing means as it flows therethrough.

8. The coupling of claim 7 and including means disposed in said first passage means for controlling the rate of flow of fluid through said first passage means.

9. The coupling of claim 7, and including a sealing member disposed between the housing and the sleeve in said first passage means, and means for adjusting the sealing pressure of said sealing member to thereby vary the rate of flow of the high pressure fluid through said first passage means.

10. A hydraulic coupling, comprising a stationary housing having a series of inlet openings connected to a source of high pressure hydraulic fluid and having a return opening connected to said source, a rotatable member journaled within the housing and spaced from the housing to provide a series of separate annular high pressure chambers between said housing and said rotatable member, each of said high pressure chambers communicating with one of said inlet openings, said rotatable member including a series of generally longitudinal passages with one end of each passage being connected to a hydraulic system of an element to be driven and the opposite end of each passage being connected to one of said high pressure chambers, an annular member journaled for rotation with respect to the housing and spaced from the housing to provide an annular low pressure chamber therebetween, return conduit means for returning hydraulic fluid from said hydraulic systems to said low pressure chamber, restricted passage means connecting one of said high pressure chambers to the low pressure chamber, and check valve means located in said restricted passage means for permitting flow of hydraulic fluid from the high pressure chamber to the low pressure chamber and for preventing flow of fluid in the opposite direction.

11. The coupling of claim 10, in which said annular chambers are spaced axially of said rotatable member and said coupling includes sealing means located between adjacent chambers.

12. The coupling of claim 11, and including separate adjustment means associated with each sealing means for varying the sealing pressure of each sealing means and permitting a controlled flow of fluid through said sealing means to the low pressure chamber.

References Cited

UNITED STATES PATENTS

| | | | |
|---|---|---|---|
| 2,278,807 | 4/1942 | Tremolada | 285—190 X |
| 2,412,287 | 12/1946 | Phillips | 285—94 |
| 2,418,653 | 4/1947 | McCormack | 285—134 |
| 2,693,373 | 11/1954 | Tremolada | 285—94 |
| 2,701,146 | 2/1955 | Warren | 285—134 |
| 2,717,166 | 9/1955 | Hedden | 285—94 |
| 2,766,065 | 10/1956 | Joyslen | 285—278 |
| 2,957,709 | 10/1960 | Skarstrom | 285—134 |
| 2,985,468 | 5/1961 | Shaw et al. | 285—94 |

CARL W. TOMLIN, *Primary Examiner.*

WAYNE L. SHEDD, *Assistant Examiner.*